(12) United States Patent
Curtis et al.

(10) Patent No.: US 8,196,039 B2
(45) Date of Patent: Jun. 5, 2012

(54) RELEVANT TERM EXTRACTION AND CLASSIFICATION FOR WIKI CONTENT

(75) Inventors: Bryce Allen Curtis, Round Rock, TX (US); Stewart Earle Nickolas, Austin, TX (US); Wayne Elmo Vicknair, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1340 days.

(21) Appl. No.: 11/482,628

(22) Filed: Jul. 7, 2006

(65) Prior Publication Data

US 2008/0010249 A1 Jan. 10, 2008

(51) Int. Cl.
G06F 17/00 (2006.01)
G06F 17/20 (2006.01)
G06F 17/21 (2006.01)
G06F 17/22 (2006.01)
G06F 17/24 (2006.01)
G06F 17/25 (2006.01)
G06F 17/26 (2006.01)
G06F 17/27 (2006.01)
G06F 17/28 (2006.01)

(52) U.S. Cl. ............... 715/259; 715/243; 715/256
(58) Field of Classification Search .......... 715/243, 715/256, 259; 707/1, 101, E17.089, 3
See application file for complete search history.

(56) References Cited

U.S. PATENT DOCUMENTS

| | | | |
|---|---|---|---|
| 4,853,843 A | 8/1989 | Ecklund | |
| 5,113,341 A | 5/1992 | Kozol et al. | |
| 5,475,805 A | 12/1995 | Murata | |
| 5,802,299 A | 9/1998 | Logan et al. | |
| 5,905,992 A | 5/1999 | Lucas et al. | |
| 5,983,227 A | 11/1999 | Nazem et al. | |
| 6,182,085 B1 | 1/2001 | Eichstaedt et al. | |
| 6,216,140 B1 | 4/2001 | Kramer | |
| 6,233,600 B1 | 5/2001 | Salas et al. | |
| 6,278,449 B1 | 8/2001 | Sugiarto et al. | |
| 6,327,628 B1 | 12/2001 | Anuff et al. | |
| 6,446,091 B1 | 9/2002 | Noren et al. | |
| 6,480,883 B1 | 11/2002 | Tsutsumitake | |
| 6,505,242 B2 | 1/2003 | Holland et al. | |
| 6,507,867 B1 | 1/2003 | Holland et al. | |
| 6,570,582 B1 | 5/2003 | Sciammarella et al. | |
| 6,601,057 B1 | 7/2003 | Underwood et al. | |
| 6,615,224 B1 | 9/2003 | Davis | |
| 6,763,388 B1 | 7/2004 | Tsimelzon | |
| 6,832,263 B2 | 12/2004 | Polizzi et al. | |
| 6,973,483 B2 | 12/2005 | Hewett et al. | |
| 6,976,209 B1 | 12/2005 | Storisteanu et al. | |

(Continued)

OTHER PUBLICATIONS

Volkel et al., "Semantic Wikipedia", May 2006, IW3C2, p. 585-594.*

(Continued)

Primary Examiner — Kyle Stork
Assistant Examiner — Nicholas Hasty
(74) Attorney, Agent, or Firm — Yee & Associates, P.C.; Steven L. Bennett

(57) ABSTRACT

A method for programmatically extracting terms from a page is provided. A request to extract terms from a current page is received from a client browser. Responsive to receiving the request to extract terms from the current page, a command to extract terms from the current page is executed. A response is sent to the client browser. The response includes a result of the command to extract terms from the current page.

16 Claims, 6 Drawing Sheets

U.S. PATENT DOCUMENTS

| | | | |
|---|---|---|---|
| 7,007,232 B1 | 2/2006 | Ross et al. | |
| 7,099,870 B2 | 8/2006 | Hsu et al. | |
| 7,111,048 B2 | 9/2006 | Hewett et al. | |
| 7,152,104 B2 | 12/2006 | Musante et al. | |
| 7,167,903 B2 | 1/2007 | Percival | |
| 7,185,008 B2 | 2/2007 | Kawatani | |
| 7,240,826 B2 | 7/2007 | Abecassis et al. | |
| 7,269,590 B2 | 9/2007 | Hull et al. | |
| 7,289,982 B2 | 10/2007 | Saito et al. | |
| 7,305,475 B2 | 12/2007 | Tock | |
| 7,370,004 B1 | 5/2008 | Patel et al. | |
| 7,370,276 B2 | 5/2008 | Willis | |
| 7,444,358 B2 | 10/2008 | Paczkowski et al. | |
| 7,523,126 B2 | 4/2009 | Rivette et al. | |
| 7,546,530 B1 | 6/2009 | Shuster et al. | |
| 7,587,669 B2 | 9/2009 | Rana | |
| 7,627,663 B2 | 12/2009 | Salesky et al. | |
| 7,685,198 B2 | 3/2010 | Xu et al. | |
| 7,698,327 B2 | 4/2010 | Kapur | |
| 7,747,599 B1 | 6/2010 | Depelteau et al. | |
| 7,954,052 B2 | 5/2011 | Curtis et al. | |
| 2001/0004746 A1 | 6/2001 | Wright | |
| 2001/0051907 A1 | 12/2001 | Kumar et al. | |
| 2002/0103856 A1 | 1/2002 | Hewett et al. | |
| 2002/0052954 A1 | 5/2002 | Polizzi et al. | |
| 2002/0059399 A1 | 5/2002 | Learmonth | |
| 2002/0078057 A1 | 6/2002 | Wang et al. | |
| 2002/0083132 A1 | 6/2002 | Holland et al. | |
| 2002/0092004 A1 | 7/2002 | Lee et al. | |
| 2002/0095399 A1 | 7/2002 | Devine et al. | |
| 2002/0103867 A1* | 8/2002 | Schilter | 709/206 |
| 2002/0129106 A1 | 9/2002 | Gutfreund | |
| 2002/0138331 A1 | 9/2002 | Hosea et al. | |
| 2002/0147611 A1 | 10/2002 | Greene et al. | |
| 2002/0188632 A1 | 12/2002 | Su | |
| 2003/0013492 A1 | 1/2003 | Bokhari et al. | |
| 2003/0018596 A1 | 1/2003 | Chang | |
| 2003/0046307 A1 | 3/2003 | Rivette et al. | |
| 2003/0046639 A1 | 3/2003 | Fai et al. | |
| 2003/0074446 A1 | 4/2003 | Musante et al. | |
| 2003/0117437 A1 | 6/2003 | Cook et al. | |
| 2003/0140309 A1* | 7/2003 | Saito et al. | 715/500 |
| 2003/0167267 A1* | 9/2003 | Kawatani | 707/6 |
| 2003/0167315 A1 | 9/2003 | Chowdhry et al. | |
| 2003/0195896 A1 | 10/2003 | Suda et al. | |
| 2003/0220972 A1 | 11/2003 | Montet et al. | |
| 2004/0003096 A1 | 1/2004 | Willis | |
| 2004/0003097 A1 | 1/2004 | Willis et al. | |
| 2004/0003351 A1 | 1/2004 | Sommerer et al. | |
| 2004/0039795 A1 | 2/2004 | Percival | |
| 2004/0064570 A1 | 4/2004 | Tock | |
| 2004/0070605 A1 | 4/2004 | Huang et al. | |
| 2004/0104931 A1 | 6/2004 | Schmitt | |
| 2004/0107249 A1 | 6/2004 | Moser et al. | |
| 2004/0139208 A1 | 7/2004 | Tuli | |
| 2004/0205558 A1* | 10/2004 | Holloway et al. | 715/513 |
| 2004/0249801 A1 | 12/2004 | Kapur | |
| 2004/0260730 A1 | 12/2004 | Iwama | |
| 2005/0027823 A1 | 2/2005 | Rana | |
| 2005/0071752 A1 | 3/2005 | Marlatt | |
| 2005/0081111 A1 | 4/2005 | Morgan et al. | |
| 2005/0108266 A1* | 5/2005 | Cao et al. | 707/101 |
| 2005/0120288 A1 | 6/2005 | Boehme et al. | |
| 2005/0144563 A1 | 6/2005 | Hough et al. | |
| 2005/0193347 A1 | 9/2005 | Van Dam | |
| 2005/0216421 A1 | 9/2005 | Barry et al. | |
| 2005/0218236 A1 | 10/2005 | Silverbrook et al. | |
| 2005/0261891 A1 | 11/2005 | Chan et al. | |
| 2006/0064471 A1 | 3/2006 | Hewett et al. | |
| 2006/0075019 A1 | 4/2006 | Donovan et al. | |
| 2006/0095835 A1 | 5/2006 | Kennedy et al. | |
| 2006/0117005 A1 | 6/2006 | Stewart et al. | |
| 2006/0123334 A1 | 6/2006 | Balasubramanyan et al. | |
| 2006/0206462 A1 | 9/2006 | Barber | |
| 2006/0235984 A1 | 10/2006 | Kraus et al. | |
| 2007/0011155 A1* | 1/2007 | Sarkar | 707/5 |
| 2007/0043837 A1 | 2/2007 | Kruse et al. | |
| 2007/0050446 A1 | 3/2007 | Moore | |
| 2007/0100803 A1* | 5/2007 | Cava | 707/3 |
| 2007/0113187 A1 | 5/2007 | McMullen et al. | |
| 2007/0118794 A1 | 5/2007 | Hollander et al. | |
| 2007/0136201 A1 | 6/2007 | Sah et al. | |
| 2007/0174247 A1* | 7/2007 | Xu et al. | 707/3 |
| 2007/0226077 A1* | 9/2007 | Frank et al. | 705/27 |
| 2007/0260612 A1 | 11/2007 | Papakonstantinou et al. | |
| 2007/0271274 A1* | 11/2007 | Purang et al. | 707/10 |
| 2007/0288514 A1* | 12/2007 | Reitter et al. | 707/104.1 |
| 2007/0294233 A1 | 12/2007 | Sheu et al. | |
| 2008/0010338 A1 | 1/2008 | Curtis et al. | |
| 2008/0010341 A1 | 1/2008 | Curtis et al. | |
| 2008/0010345 A1 | 1/2008 | Curtis et al. | |
| 2008/0010386 A1 | 1/2008 | Curtis et al. | |
| 2008/0010387 A1 | 1/2008 | Curtis et al. | |
| 2008/0010388 A1 | 1/2008 | Curtis et al. | |
| 2008/0010590 A1 | 1/2008 | Curtis et al. | |
| 2008/0010609 A1 | 1/2008 | Curtis et al. | |
| 2008/0010615 A1 | 1/2008 | Curtis et al. | |
| 2008/0040661 A1 | 2/2008 | Curtis et al. | |
| 2008/0065769 A1 | 3/2008 | Curtis et al. | |
| 2008/0126944 A1 | 5/2008 | Curtis et al. | |
| 2008/0195595 A1* | 8/2008 | Masuyama et al. | 707/5 |

OTHER PUBLICATIONS

Cutrell et al. "Fast, Flexible Filering with Phlat—Personal Search and Organization Made Easy" Apr. 2006, ACM.*

Chen et al., "Component-based Web page management environment", Information Sciences, Amsterdam NL, vol. 176, No. 6, Mar. 22, 2006, pp. 628-639.

U.S. Appl. No. 11/482,353, filed Jul. 7, 2006, Curtis et al.
U.S. Appl. No. 11/482,376, filed Jul. 7, 2006, Curtis et al.
U.S. Appl. No. 11/482,496, filed Jul. 7, 2006, Curtis et al.
U.S. Appl. No. 11/482,388, filed Jul. 7, 2006, Curtis et al.
U.S. Appl. No. 11/482,377, filed Jul. 7, 2006, Curtis et al.
U.S. Appl. No. 11/482,999, filed Jul. 7, 2006, Curtis et al.
U.S. Appl. No. 11/482,472, filed Jul. 7, 2006, Curtis et al.
U.S. Appl. No. 11/482,207, filed Jul. 7, 2006, Curtis et al.
U.S. Appl. No. 11/482,352, filed Jul. 7, 2006, Curtis et al.
U.S. Appl. No. 11/483,347, filed Jul. 7, 2006, Curtis et al.
U.S. Appl. No. 11/482,426, filed Jul. 7, 2006, Curtis et al.
U.S. Appl. No. 11/482,450, filed Jul. 7, 2006, Curtis et al.

USPTO office action for U.S. Appl. No. 11/482,472 dated Nov. 12, 2010.

USPTO office action for U.S. Appl. No. 11/482,999 dated Oct. 13, 2010.

USPTO office action for U.S. Appl. No. 11/482,377 dated Nov. 29, 2010.

USPTO office action for U.S. Appl. No. 11/482,207 dated Jul. 23, 2010.

Nuckchady, "A Framework for Building Collaborative Applications", Unviersity of Tampere Dept of Computer Sciences, MSc thesis, Nov. 2004, pp. 1-81.

Lamming et al., "Satchel: Providing Access to Any Document, Any Time, Anywhere", Transactions on Computer-Human Interaction (TOCHI), vol. 7, Issue 3, Sep. 2000, pp. 322-352.

USPTO office action for U.S. Appl. No. 11/482,388 dated Dec. 10, 2010.

Cutrell et al., "Fast, Flexible Filtering with Phlat—Personal Search and Organization Made Easy", CHI '06 Proceedings of the SIGCHI conference on Human Factors in computing systems, Apr. 2006, pp. 261-270.

USPTO Final Office Action dated Apr. 29, 2011 in connection with U.S. Appl. No. 11/482,472.

USPTO Notice of Allowance dated May 27, 2011 in connection with U.S. Appl. No. 11/482,388.

Lamping et al., "A Focus+Context Technique Based Hyperbolic Geometry for Visualizing Large Hierarchies", CHI '95, Proceedings Papers, Xerox Palo Alto Research Center, 1995, pp. 1-8.

USPTO OA for U.S. Appl. No. 11/482,207 dated Feb. 5, 2010.
USPTO Final OA for U.S. Appl. No. 11/482,388 dated Apr. 19, 2010.
USPTO Final OA for U.S. Appl. No. 11/483,347 dated Mar. 9, 2010.
USPTO Appeal Brief regarding U.S. Appl. No. 11/482,207, dated Jan. 20, 2011.

USPTO Examiner's Answer regarding U.S. Appl. No. 11/482,207, dated Apr. 14, 2011.
USPTO Reply Brief regarding U.S. Appl. No. 11/482,207, dated Jun. 13, 2011.
USPTO Office Action regarding U.S. Appl. No. 11/482,352, dated May 13, 2009.
USPTO Office Action regarding U.S. Appl. No. 11/482,353, dated Jul. 15, 2009.
USPTO Office Action regarding U.S. Appl. No. 11/482,376, dated Apr. 9, 2009.
USPTO Office Action regarding U.S. Appl. No. 11/482,377, dated Aug. 25, 2009.
USPTO Final Office Action regarding U.S. Appl. No. 11/482,377, dated Apr. 2, 2010.
USPTO Office Action regarding U.S. Appl. No. 11/482,388, dated Aug. 20, 2009.
USPTO Appeal Brief regarding U.S. Appl. No. 11/482,388, dated Sep. 16, 2010.
USPTO Notice of Allowance regarding U.S. Appl. No. 11/482,388, dated Oct. 7, 2011.
USPTO Office Action regarding U.S. Appl. No. 11/482,426, dated Jul. 15, 2009.
USPTO Office Action regarding U.S. Appl. No. 11/482,450, dated Jul. 14, 2009.
USPTO Office Action regarding U.S. Appl. No. 11/482,496, dated Jan. 21, 2009.
USPTO Notice of Allowance regarding U.S. Appl. No. 11/482,999, dated Jan. 25, 2011.
USPTO Office Action regarding U.S. Appl. No. 11/483,347, dated Aug. 4, 2009.
USPTO Appeal Brief regarding U.S. Appl. No. 11/483,347, dated Aug. 4, 2010.
USPTO Examiner's Answer regarding U.S. Appl. No. 11/483,347, dated Nov. 1, 2010.
"Ajax (programming)", http://en.wikipedia.org/wiki/AJAX, accessed Jan. 13, 2009, 4 pages.
"AJAX Training", http://www.w3schools.com/Ajax/ajax_httprequest.asp, accessed Jan. 13, 2009, 3 pages.

* cited by examiner

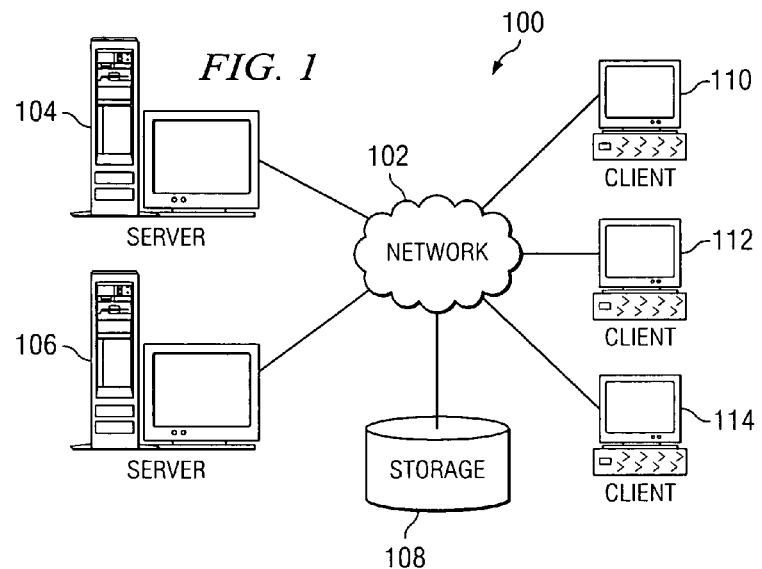
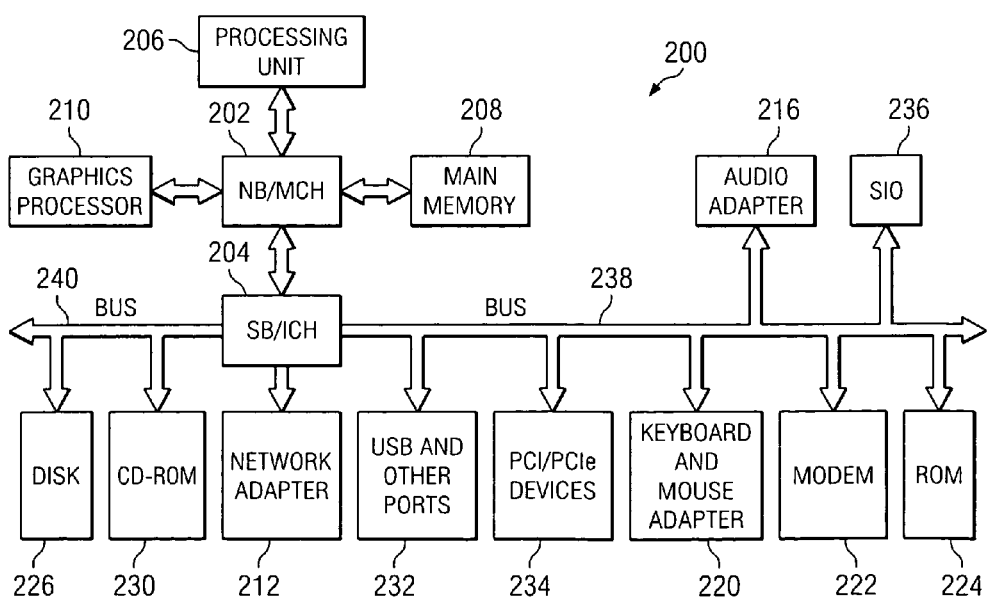

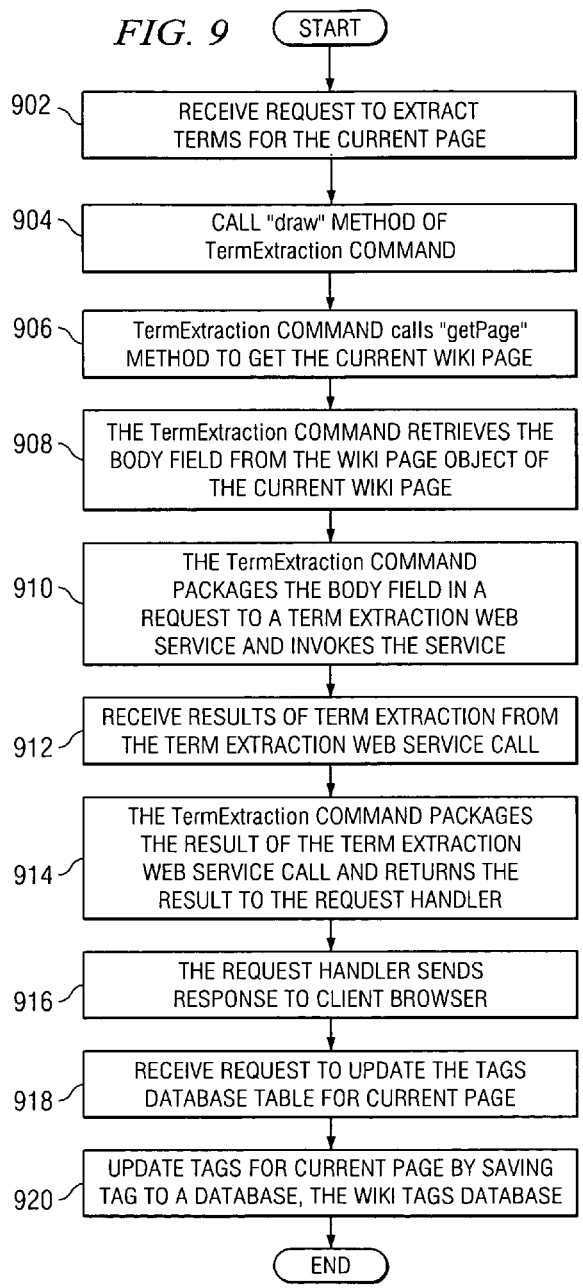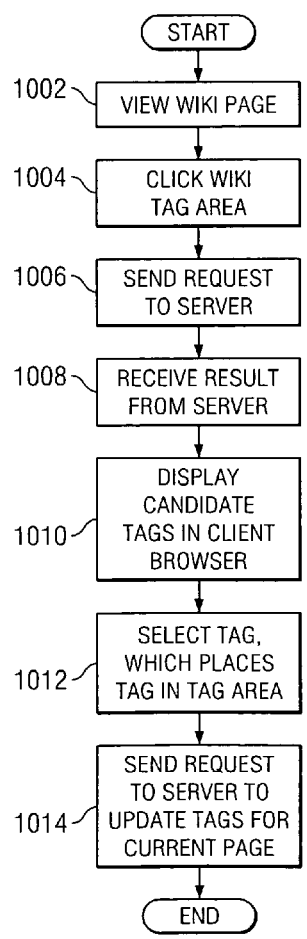

RELEVANT TERM EXTRACTION AND CLASSIFICATION FOR WIKI CONTENT

CROSS-REFERENCE TO RELATED APPLICATIONS

The present invention is related to the following applications entitled Method and Apparatus for Data Hub Objects, Curtis et al., Ser. No. 11/482,353; Method for Defining a Wiki Page Layout using a Wiki Page, Curtis et al., Ser. No. 11/482,376; Method for Extending the Capabilities of a Wiki Environment, Curtis et al., Ser. No. 11/482,496; Method for Programmatically Hiding and Displaying Wiki Page Layout Sections, Curtis et al., Ser. No. 11/482,388; Method for Inheriting a Wiki Page Layout for a Wiki Page, Curtis et al., Ser. No. 11/482,377; Method for Processing a Web Page for Display in a Wiki Environment, Curtis et al., Ser. No. 11/482,999; Processing Model of an Application Wiki, Curtis et al., Ser. No. 11/482,472; Generic Frequency Weighted Visualization Component, Curtis et al., Ser. No. 11/482,207; Method and Apparatus for Client Wiring Model, Curtis et al., Ser. No. 11/482,352; Method and Apparatus for Server Wiring Model, Curtis et al., Ser. No. 11/483,347; Method and Apparatus for Client and Server Interaction, Curtis et al., Ser. No. 11/482,426; and Method and Apparatus for Argument Detection for Event Firing, Curtis et al., Ser. No. 11/482,450; all filed even date hereof, all assigned to a common assignee, and all of which are incorporated herein by reference.

BACKGROUND

1. Technical Invention

The present invention relates generally to an improved data processing system and in particular to a method and apparatus for a programming model. Still more particularly, the present invention relates to a computer implemented method, apparatus, and computer usable program code for manipulating content using a browser.

2. Description of the Related Art

The Internet is a global network of computers and networks joined together by gateways that handle data transfer in the conversion of messages from a protocol of the sending network to a protocol of the receiving network. On the Internet, any computer may communicate with any other computer in which information travels over the Internet through a variety of languages referred to as protocols. The set of protocols most commonly used on the Internet is called transmission control protocol/internet protocol (TCP/IP).

The Internet has revolutionized communications and commerce as well as being a source of both information and entertainment. One type of software that has become more frequently used is Wiki software. Wiki software is a type of collaborative software that runs a Wiki environment. This software is in a shared environment that may be accessed through an interface by a group of users. A Wiki application is a type of website that allows users to manipulate content. Users may add, remove, or otherwise edit and change content very quickly and easily. Wiki applications are often used as an effective tool for collaborative writing. The current use of Wiki applications is directed towards collaborative content creation, such as online encyclopedias or other knowledge bases. Users typically can create content in a shared environment. In this environment, revisions of pages are saved to allow previous versions to be restored. Further, mark-up shortcuts are provided for creating inter-page links. Further, a "what you see is what you get" (WYSIWYG) is often present.

BRIEF SUMMARY

Exemplary embodiments describe a computer implemented method, a computer program product and a data processing system for programmatically extracting terms from a page. A request to extract from a current page is received from a client browser. Responsive to receiving the request to extract terms from the current page, a command to extract terms from the current page is executed. A response is sent to the client browser. The response includes a result of the command to extract terms from the current page.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment of the present invention when read in conjunction with the accompanying drawings, wherein:

FIG. 1 is a pictorial representation of a network of data processing systems in which illustrative embodiments of the present invention may be implemented;

FIG. 2 is a block diagram of a data processing system in which illustrative embodiments of the present invention may be implemented;

FIG. 9 is a flowchart illustrating the operation of programmatically extracting relevant terms from a Wiki page in accordance with an illustrative embodiment of the present invention; and FIG. 10 is a flowchart illustrating the operation of a client browser programmatically extracting relevant terms from a Wiki page in accordance with an illustrative embodiment of the present invention.

DETAILED DESCRIPTION OF AN ILLUSTRATIVE EMBODIMENT

Figure 3:
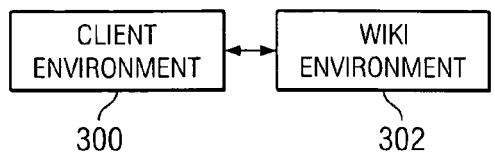
FIG. 3 is a diagram illustrating components for use in generating and using Wiki applications in accordance with an illustrative embodiment of the present invention.

With reference now to the figures and in particular with reference to FIGS. 1-2, exemplary diagrams of data processing environments are provided in which illustrative embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which illustrative embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

With reference now to FIG. 2, a block diagram of a data processing system is shown in which illustrative embodiments of the present invention may be implemented. Data processing system 200 is an example of a computer, such as server 104 or client 110 in FIG. 1, in which computer usable code or instructions implementing the processes may be located for the illustrative embodiments of the present invention.

In the depicted example, data processing system 200 employs a hub architecture including a north bridge and memory controller hub (MCH) 202 and a south bridge and input/output (I/O) controller hub (ICH) 204. Processor 206, main memory 208, and graphics processor 210 are coupled to north bridge and memory controller hub 202. Graphics processor 210 may be coupled to the MCH through an accelerated graphics port (AGP), for example.

In the depicted example, local area network (LAN) adapter 212 is coupled to south bridge and I/O controller hub 204 and audio adapter 216, keyboard and mouse adapter 220, modem 222, read only memory (ROM) 224, universal serial bus (USB) ports and other communications ports 232, and PCI/PCIe devices 234 are coupled to south bridge and I/O controller hub 204 through bus 238, and hard disk drive (HDD) 226 and CD-ROM drive 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processor 206 and coordinates and provides control of various components within data processing system 200 in FIG. 2. The operating system may be a commercially available operating system such as MICROSOFT° WINDOWS® XP (MICROSOFT® and WINDOWS® are trademarks of MICROSOFT CORPORATION in the United States, other countries, or both). An object oriented programming system, such as the JAVA™ programming system, may run in conjunction with the operating system and provides calls to the operating system from JAVA™ programs or applications executing on data processing system 200 (JAVA™ and all JAVA™-based trademarks are trademarks of SUN MICROSYSTEMS, INC. in the United States, other countries, or both).

Instructions for the operating system, the object-oriented programming system, and applications or programs are located on storage devices, such as hard disk drive 226, and may be loaded into main memory 208 for execution by processor 206. The processes of the illustrative embodiments of the present invention may be performed by processor 206 using computer implemented instructions, which may be located in a memory such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments of the present invention may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may be comprised of one or more buses, such as a system bus, an I/O bus and a PCI bus. Of course the bus system may be implemented using any type of communications fabric or architecture that provides for a transfer of data between different components or devices attached to the fabric or architecture. A communications unit may include one or more devices used to transmit and receive data, such as a modem or a network adapter. A memory may be, for example, main memory 208 or a cache such as found in north bridge and memory controller hub 202. A processing unit may include one or more processors or CPUs. The depicted examples in FIGS. 1-2 and above-described examples are not meant to imply architectural limitations. For example, data processing system 200 also may be a tablet computer, laptop computer, or telephone device in addition to taking the form of a PDA.

In the illustrative examples, server 104 may host a Wiki application. The environment at server 104 allows clients, such as clients 110, 112, and 114 to collaborate and develop applications in accordance with an illustrative embodiment of the present invention. These applications may include, for example, weather related applications, registrations and rosters for schools, e-mail applications, and other types of business oriented applications. The different embodiments may include processes at the server side, client side, or both sides in providing a collaborative environment to develop Wiki applications in accordance with an illustrative embodiment of the present invention.

The illustrative embodiments of the present invention recognize that current Wiki applications are not suited for collaborative development of applications beyond collaboration of text and files as a knowledgebase or document. Thus, illustrative embodiments of the present invention provide for a programmatic extraction of terms form the content of a Wiki application. These terms may be used as tags for a given page or set of pages. The tags can be used to search the Wiki in a more meaningful way, locating and better understanding and managing the information within the Wiki.

Turning now to FIG. 3, a diagram illustrating components for use in generating and using Wiki applications is depicted in accordance with an illustrative embodiment of the present invention. In this example, a user may interact with client environment 300 to generate and use applications supported by Wiki environment 302. Client environment 300 is a software application or environment executing on a client, such as client 110 in FIG. 1. Wiki environment 302 executes on a data processing system, such as server 104 in FIG. 1. In these examples, a user at client environment 300 may send a request to Wiki environment 302 for the page. Wiki environment 302 returns a page. In these illustrative examples, the page includes JavaScript that enables the user to manipulate and select content for the page. In the illustrative embodiments of the present invention, these pages are collaborative Web pages that provide user access to applications. These applications are collaborative applications that may be used and modified by users at client computers.

In particular, the different illustrative embodiments of the present invention provide a method and apparatus for a user to generate an application with functionality beyond functioning as a collaborative writing tool. Many of the features in these examples are provided through PHP. Depending on the particular implementation, the different features provided in the illustrative embodiments of the present invention may be facilitated through the use of a virtual machine, such as a Java virtual machine (JVM). Also, other scripting languages other than JavaScript may be used to implement these processes, depending on the particular embodiment. The user makes the request through a browser within client environment 300 in these examples.

Figure 4:
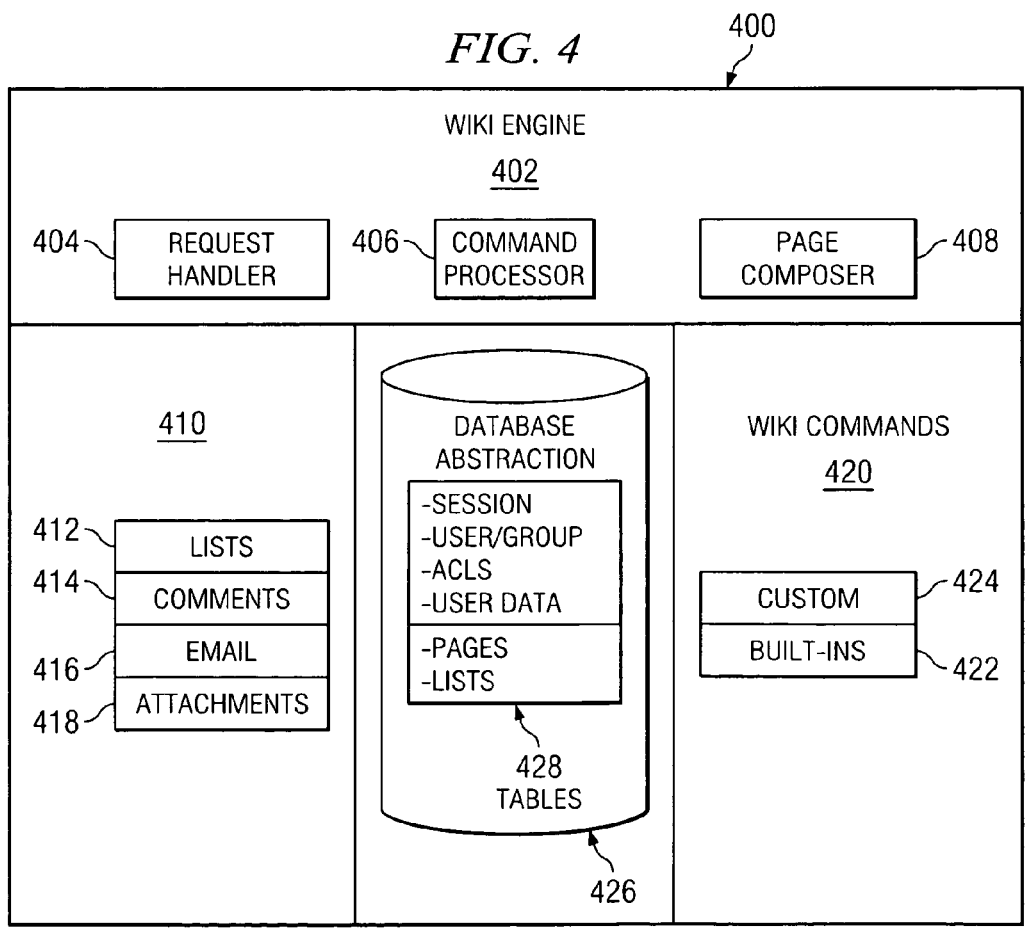
FIG. 4 is a diagram illustrating Wiki architecture in accordance with an illustrative embodiment of the present invention.

Turning now to FIG. 4, a diagram illustrating Wiki architecture is depicted in accordance with an illustrative embodiment of the present invention. In these particular examples, this architecture is a Quite Easily Done (QED) Wiki architecture. As illustrated, Wiki environment 400 contains Wiki engine 402. This engine includes request handler 404, command processor 406, and page composer 408. Request handler 404 receives requests from clients. For example, a user may send a universal resource identifier (URI) in the form of a universal resource locator (URL) to Wiki system 400.

This request is received by request handler 404 for processing. In these examples, one page is generated for each request handled by request handler 404.

Command processor 406 processes different commands to build a page in response to a request received by request handler 404. Additionally, command processor 406 renders the page when processing of commands and text fragments has completed. Page composer 408 also is involved in generating the page request by the user. In these examples, page composer 408 is employed in layouts, page body content, and script collection for a page.

Wiki environment 400 also includes ancillary functions 410. In this example, ancillary functions 410 contains lists 412, comments 414, email 416, and attachments 418. With lists 412, a user may generate lists for other users to see. Further, using comments 414, the user may add commentary or other text to different pages. Further, attachments 418 allows a user to attach files to a particular page. Email 416 allows for users to be notified when pages have been updated or modified.

Additionally, Wiki environment 400 contains Wiki commands 420. Wiki commands 420 contain two types of commands, built-in commands 422 and custom commands 424.

Built-in commands 422 are commands or services that are present within Wiki system 400. Custom commands 424 reference commands that are provided through exterior sources. Basically, these commands allow a user to include and process data for a page. Typically, Wiki commands 420 involve the use of service oriented architecture (SOA). These commands allow a user to include services with a page.

In these examples, the commands reference services with well defined interfaces that are independent of the applications and the competing platforms in which they run. In the depicted examples, the services are software modules. These types of services are typically based on a standard-compliant interface, such as web service description language (WSDL). Of course, the services referenced by Wiki commands 420 may involve any type of interface. These commands may take various forms. For example, the commands may be for financial, weather, mapping, news and events, searching, government, or international information.

Database 426, contains information, such as the pages requested and created by users. Further, revisions of pages, attachments, comments, and other information are stored within database 426. Information is typically stored in the form of tables 428 within database 426 in the illustrative embodiments of the present invention.

Figure 5:
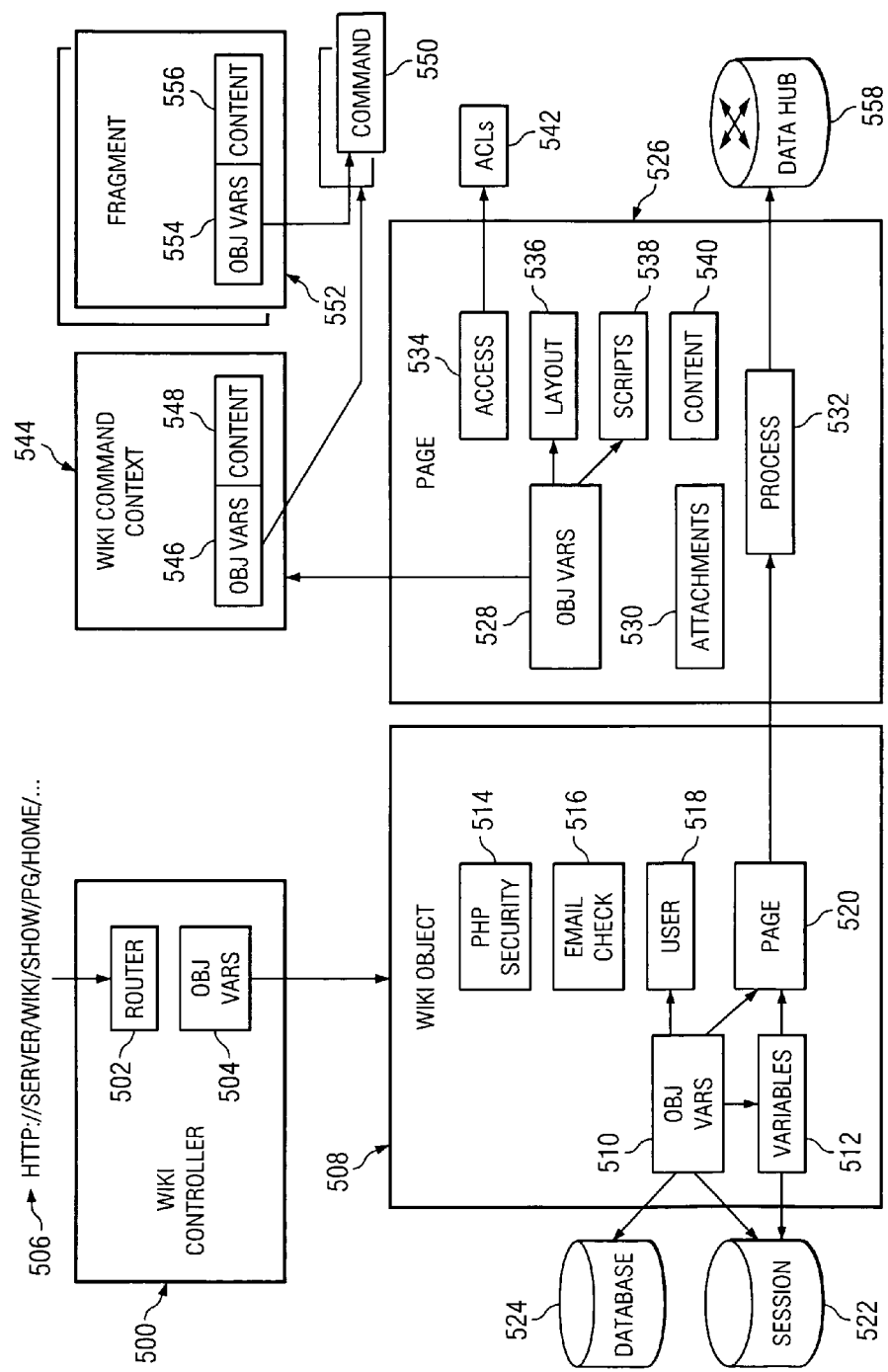
FIG. 5 is a diagram illustrating dataflow in rendering a page in accordance with an illustrative embodiment of the present invention.

Turning now to FIG. 5, a diagram illustrating dataflow in rendering a page is depicted in accordance with an illustrative embodiment of the present invention. In these examples, a page is rendered on a server when processing of the page is completed and the page is ready for transmission to a client. The different components illustrated in FIG. 5 are manipulated through a Wiki engine, such as Wiki engine 402 in FIG. 4.

The programming architecture and model illustrated in these illustrative embodiments of the present invention allow for visual assembly of Wiki content using a browser on a client. Everything requested by a client is conceptually a page. For example, a variable is referenced using a universal resource identifier model, such as including a page and variable name. Further, pages are used as data structures in these examples. Variables are stored for later use. These variables include session variables, request variables, and persistent variables. In the illustrative examples, users create structured data through lists. These lists may be queried, searched, and/or combined. In manipulating lists, the users employ a create, retrieve, update, and delete (CRUD) process. These illustrative embodiments of the present invention also provide simple decorative and automatic wiring models based on metadata.

Wiki controller 500 receives universal resource identifier 506 from a user. Wiki controller 500 contains router 502 and object variables 504. Router 502 delegates request processing to the appropriate request handler. Object variables 504 provide interconnection between the processing components. For example, Wiki controller 500 has object variable 504 "Wiki" which is a pointer to Wiki object 508. Each object in FIG. 5 has object variables that are references to other resources required for object interaction. Wiki controller 500 is handled by a request handler, such as request handler 404 in FIG. 4.

In response to receiving universal resource identifier 506, Wiki controller 500 instantiates an instance of Wiki object 508. As illustrated, Wiki object 508 contains object variables 510, variables 512, PHP security 514, email check 516, user 518 and page 520. Wiki object 508 is an instance that is always instantiated whenever a request is received. This object acts as a repository for all of the objects used to generate content for page 520.

In these examples, object variable 510 contains the information needed to process page 520. Variables 512 contain session information stored in session 522. This session information is information used only during user interaction with a page or during the generation of a page in these examples. More persistent data in object variables 510 are stored in database 524. Database 524 stores any information that may be used to generate the page or to store changes made by a user in the depicted examples.

PHP security 514 is a function used to determine whether code identified by a client may be run as well as initiating running the code. PHP is an open source programming language that is mainly employed on server side applications. In these illustrative examples, PHP code may be executed by different objects within the Wiki environment. In these examples, a user may run PHP code from the client side. Email check 516 is provided in Wiki object 508 to check for email messages that may be displayed on page 520 when page 520 is rendered and sent to a user. User 518 contains information about the user. For example, privilege levels, the identification of a user, and log of the session may be stored in user 518 within Wiki object 508.

Page 526 is a more detailed example of page 520 contained within Wiki object 508. In this example, page 526 contains object variables 528, attachments 530, process 532, access 534, layout 536, scripts 538 and content 540. In these examples, object variables 528 contain an instance of variables for page data structures. For example, a section array may be present to provide for layout information. A context pointer may point to a root Wiki command. An instance ID may be present in object variables 528 to point to an internal page ID. These different variables contain information needed to render page 526 to be sent to a user.

Attachments 530 are identifications of attachments that may be presented on a page. If the user selects an attachment, the attachment can then be downloaded to the user at that time. Process 532 contains the code used to generate the page to be delivered to the user. In these examples, the process is a method, for example, to identify content for the page, identify any attachments and identify any scripts that may be included in the page to be sent to the user.

Access 534 is used to determine what access the user has to content to be placed on the page. This access is identified through access control lists (ACLs) 542. The content may vary for page 526 depending on the access that the particular user has. This user is the user requesting page 526. In generating content for page 526, object variable 528 references Wiki command context 544. This command context contains object variables 546 and content 548. Object variables 546 represent the in-memory version of a page's contents. These variables include a list of the commands and a list of text fragments that comprise the current page. Content 548 represents the object methods used to manipulate the page content.

In executing process 532 in page 526, a set of commands from commands 550 are identified through Wiki command context 544. Wiki command context 544 generates a set of command instances from commands 550. Wiki command context 544 parses the page content 540 and loads the commands to create a tree structure of fragments, such as fragment 552. Fragment 552 also contains object variables 554 and content 556. Fragment 552 is a portion of page 526 in its raw un-rendered form. In this example, Wiki command context 544 contains fragments that represent the structure of the commands that are to be included in the page. These are commands that may be manipulated by the user. When process 532 is complete, page 526 is sent down to the user. Data hub 558 is saved for later in the interaction. Also, in this example, data hub 558 is restored when a user interacts with a component within page 526. The data hub contains processes and a data structure. The processes are used to identify what commands for a page within fragment 552 are consumers of any data or commands that may be received by data hub 558. Additionally, data hub 558 will return results to the client. These results are sent to a data hub located on the client.

Figure 6:
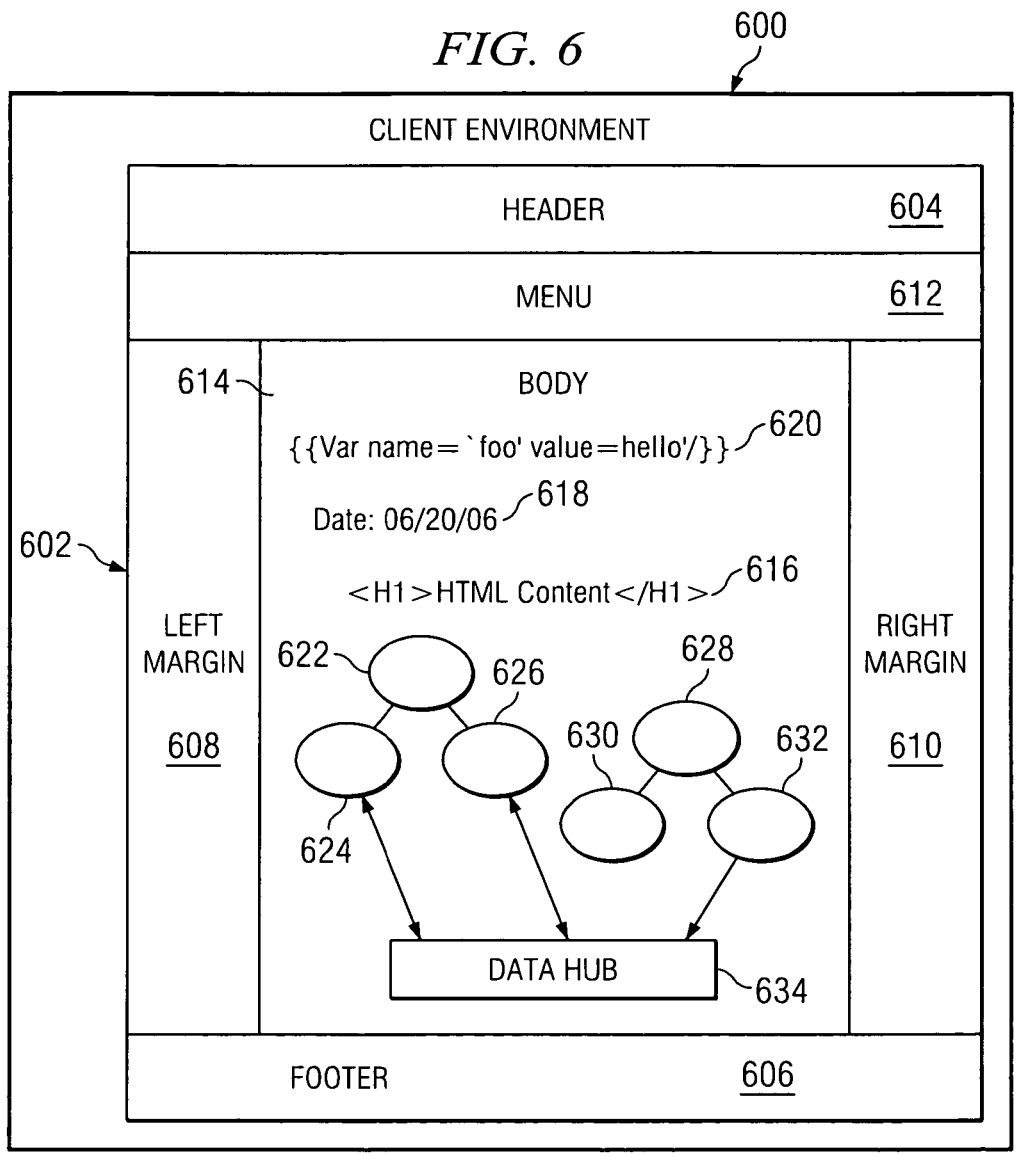
FIG. 6 is a diagram illustrating components on a client for a Wiki application in accordance with an illustrative embodiment of the present invention.

Turning now to FIG. 6, a diagram illustrating components on a client for a Wiki application is depicted in accordance with an illustrative embodiment of the present invention. In this example, client environment 600 is a more detailed illustration of client environment 300 in FIG. 3. Client environment 600 in these illustrative embodiments of the present invention may take the form of a browser or some other application that has connectivity to a network such as the Internet. As depicted, client environment 600 has received page 602. This page is rendered using a Wiki environment, such as Wiki environment 400 in FIG. 4. Page 602 has a number of different components in this example. These components include header 604, footer 606, left margin 608, right margin 610, menu 612, and body 614. Header 604, footer 606, left margin 608, and right margin 610 are areas that are typically used for laying out pages. These sections may include various content, such as hypertext markup language (HTML). Menu 612 is used to provide access to actions a user can perform on/with the page. For example, a menu item may be present in menu 612, which when clicked, sends a request to the server to allow the user to edit page content in the WYSIWYG editor.

In this example, different types of content are found within body 614. In this example, body 614 contains HTML content 616, date information 618, and variable 620. Additionally, body 614 also contains commands 622, 624, 626, 628, 630, and 632. These commands are commands for a Wiki application presented through page 602. Additionally, body 614 also includes data hub 634. Data hub 634 is similar to the data hub in a Wiki environment, such as data hub 558 in FIG. 5. This data hub also includes processes and a data structure used to send and receive data in requests between the commands in page 602 and those in a Wiki environment.

Commands 622, 624, 626, 628, 630, and 632 along with data hub 634 provide for dynamic content within page 602.

The illustration of the different types of content within page 602 is presented for purposes of illustrating the manner in which a Wiki application may be presented to a user. This illustration, however, is not meant to imply limitations as to the type and scope of content that may be used in a Wiki application.

A user may manipulate content within page 602 to use the Wiki application. Further, the user may manipulate the content to change the manner in which the Wiki application performs. In other words, the user may add content, such as additional commands or remove commands from page 602 through manipulating graphical representation of these commands to generate or modify content and/or functionality for page 602.

Frequently, when using a Wiki application to aggregate and define content, information becomes lost within the Wiki application. The users are no longer able to find necessary data, simple text searches do not work and the Wiki application quickly spirals out of control. Even in an active, established Wiki application with many pages, users may experience difficulty in getting a sense of what a page or set of pages is about.

Illustrative embodiments of the present invention provide a programmatic term extraction and categorization technique. Programmatic means performed by a computer program. The technique is programmatic in that the terms are extracted from the content by a computer program rather than by a human. A term is a word or expression that has a precise meaning in a given context. The terms in turn, serve to categorize the content of the Wiki page or set of pages. For example, if the term football appeared on a page, that page would be categorized as relating to football.

The technique both gives a user a sense of what a Wiki page or set of Wiki pages is about and suggests likely and appropriate tag candidates. A Wiki page is a page in a Wiki application. Tags are labels that are used to categorize content of a Wiki. Some examples of tags could be football, radio, television, models, and so forth.

The Wiki application is scanned and the relevant terms discussed in each page of the Wiki application are identified. The identified terms are used as tags for a given page or set of pages. The tags can be used to search the Wiki in a more meaningful way, locating and better understanding and managing the information within the Wiki.

Also, the tags can be used as the starting point for a "folksonomy" of information for the Wiki application. A "folksonomy" is a collaboratively generated, open-ended labeling system that enables Internet users to categorize content such as Web pages, online photographs, and Web links. The freely chosen labels, called tags, help to improve the effectiveness of search engines because content is categorized using a familiar, accessible, and shared vocabulary. The labeling process is called tagging. Two widely cited examples of websites using folksonomic tagging are Flickr and del.icio.us.

Figure 7:
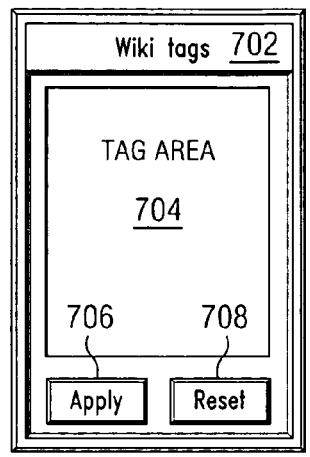
FIG. 7 is a block diagram of a Wiki tags area in accordance with an illustrative embodiment of the present invention.

FIG. 7 is a block diagram of a Wiki tags area in accordance with an illustrative embodiment of the present invention. FIG. 7 depicts a Wiki tags area, Wiki tags 702, as it would appear in a Wiki page on a client browser. A Wiki tags area is a text input area in which specific tags associated with the current page are displayed in a user-editable format. Users may also add new tags in the text input area. When a Wiki page is created, such as Wiki page 602 in FIG. 6, Wiki tags 702 is content of component left margin 608 in FIG. 6. Wiki tags 702 comprises tag area 704, apply button 706 and reset button 708. Already defined tags for a Wiki page would be displayed in tag area 704. Also, a user may enter a term to be used as a tag into tag area 704. The user may select the term and click on apply button 706, which sends the tag in a request to the server to update the tag list to include the selected term. Alternatively, a user could click reset button 708 which would erase the currently defined tags.

In an illustrative embodiment of the present invention, a user has the ability to extract and categorize relevant terms using Wiki tags 702. A user may mouse click on an empty area in tag area 704. A mouse click means to move the mouse pointer over an object and press and release a mouse button once. However a user may click on an empty area by moving any pointer to the area by other means, such as arrow keys, or trac ball, or other means and pressing the equivalent of an enter key once. This type of user input begins the process of automatically extracting and categorizing terms from the current Wiki page or set of sub-pages. A set of pages or sub-pages may be one or more pages or sub-pages. In an illustrative embodiment of the present invention, a Wiki command called TermExtraction, which is an example of a specific Wiki command 420 in FIG. 4, is used to cause programmatic extraction of terms for the current Wiki page or set of sub-pages. A Wiki command is a command used to implement a function and/or process of a Wiki application.

Figure 8:
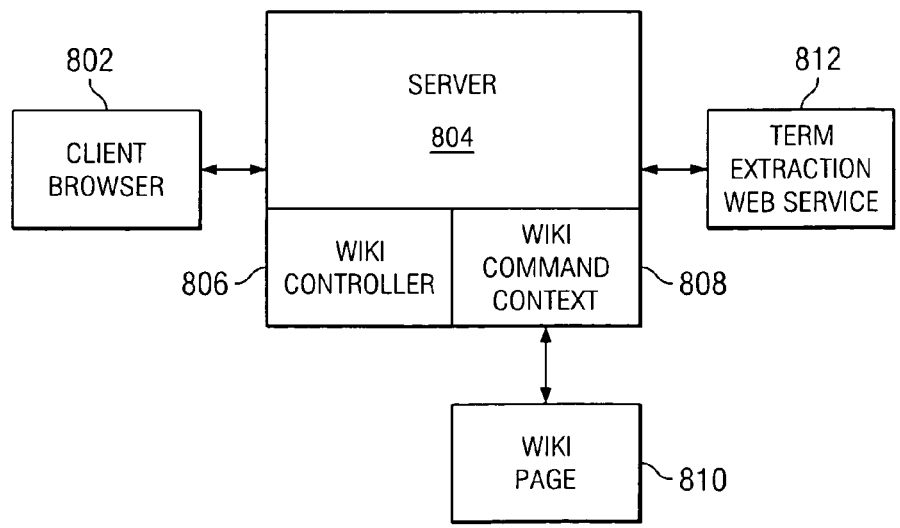
FIG. 8 is a block diagram of components for implementing a programmatic term extraction and categorization technique in accordance with an illustrative embodiment of the present invention.

FIG. 8 is a block diagram of components for implementing a programmatic term extraction and categorization technique in accordance with an illustrative embodiment of the present invention. Server 804 may be implemented as a data processing system such as data processing system 200 in FIG. 2. Server 804 contains a Wiki engine, such as Wiki engine 402 in FIG. 4. This engine includes a request handler, such as request handler 404 in FIG. 4. The request handler receives requests from clients, such as client browser 802. For example, a user may send a universal resource identifier (URI) in the form of a universal resource locator (URL) to server 804. Wiki controller 806, such as Wiki controller 500 in FIG. 5, receives a universal resource identifier from client browser 802. Wiki controller 806 is handled by a request handler.

In response to receiving a universal resource identifier, Wiki controller 806 creates Wiki command context 808, such as Wiki command context 544 in FIG. 5, which instantiates an instance of a Wiki object. A Wiki object contains Wiki page 810, such as Wiki page 602 in FIG. 6. Wiki page 810 contains page components as described in FIG. 6, including body 614. Wiki command context 808 invokes a command that causes the content of the body component of Wiki page 810 to be packed in a request, which is sent to term extraction Web service 812. The request also invokes term extraction Web service 812. A term extraction Web service is a Web service that is used to extract terms from content. A term extraction Web service returns a list of significant words or phrases extracted from a larger content. Only those terms that a content analysis algorithm categorizes as salient are extracted. In some illustrative embodiments of the present invention, a query is used to define and refine what constitutes salient terms. The terms extracted by the term extraction Web service serve to define page categories to which the current page belongs. Some examples of categories, include, sports, football, ESPN, news, moon, stars, and so forth. An example of a term extraction Web service is Yahoo Term Extraction. The result of the term extraction is returned to server 804. Then the result of the term extraction is returned to client browser 802 by Wiki controller 806 via a request handler in the Wiki engine.

FIG. 9 is a flowchart illustrating the operation of programmatically extracting relevant terms from a Wiki page in accordance with an illustrative embodiment of the present invention. The operation of FIG. 9 may be implemented by a Wiki engine, such as Wiki engine 402 in FIG. 4, and more specifically a request handler, a command processor, a Wiki controller, and a Wiki command context, such as request handler 404 and command processor 406 of FIG. 4 and Wiki controller 500 and Wiki command context 544 of FIG. 5.

The operation begins when a Wiki controller on the server receives a request to extract terms for the current Wiki page (process block 902). The Wiki controller on the server handles the request and delegates the request to a request handler, which is a specific instantiation of request handler 404 in FIG. 4. One example of a specific request handler would be an AJAX request handler. AJAX is an acronym meaning Asynchronous JavaScript and XML. AJAX is a programming model for creating interactive Web applications. Similar processing or requests can be handled using other mechanisms, such as using Java Applets or Windows ActiveX controls. AJAX is used to illustrate one manner in which requests may be handled and is not intended to limit the manner in which requests are handled. The request handler creates the Wiki command context for the current requested Wiki page.

The request handler calls the "loadplugin" method on the Wiki command context object. The loadplugin method loads the Wiki command subclass that implements the Wiki command that is invoked to achieve the automatic extraction of terms for the current Wiki page or set of sub-pages. The loadplugin method searches a set of directories on the file system looking for a PHP file named the same as the Wiki command class that the loadplugin method is asked to load. The loadplugin method finds the file and uses the PHP "include" language feature to load the file. Loading the file causes the file to be interpreted thus defining the PHP class for the Wiki command. The command context can then create instances of the loaded class.

In an illustrative embodiment of the present invention the Wiki command is called the TermExtraction command. The TermExtraction command calls the "draw" method of the TermExtraction command (process block 904). The TermExtraction command calls the "getPage" method of the Wiki object to get the current Wiki page or set of sub-pages (process block 906). A getpage method returns the Wiki page currently in process. The TermExtraction command then retrieves the body field from the Wiki page object of the current Wiki page (process block 908). A body field is an object variable, such as object variable 528 in FIG. 5, of the Wiki page object. The body field contains the raw, unrendered content of the Wiki page. Terms are extracted from the content of a page. The content of a page is stored in the body field. The body field is what is sent to the Web term extraction service in order to have the terms extracted from the content. The TermExtraction command packages the body field from the Wiki page object in a request to a term extraction Web service, such as Yahoo Term Extraction, and invokes the term extraction Web service (process block 910). The Web term extraction service extracts terms from the body field containing the content of the page currently in process.

The TermExtraction command receives the result of the term extraction from the term extraction Web service call (process block 912), packages the result and returns the result to the request handler (process block 914). The request handler, in turn, sends a response to the client browser (process block 916).

The server receives a request from the client browser to update the tags for the current page (process block 918). The server stores the tags in a database table, such as database 524 in FIG. 5, for the current Wiki page (process block 920) and the operation ends. In an illustrative embodiment of the present invention the database table is known as the "wiki_tags" database table.

FIG. 10 is a flowchart illustrating the operation of a client browser programmatically extracting relevant terms from a Wiki page in accordance with an illustrative embodiment of the present invention. The operation of FIG. 10 may be implemented by a client browser, such as client browser 802 in FIG. 8.

The operation begins when a user views a Wiki page, such as Wiki page 602 in FIG. 6, in a client browser (process block 1002). A Wiki tags area, such as Wiki tags 702 in FIG. 7, is displayed to the user in the client browser. The user clicks in the tag area, such as tag area 704 of FIG. 7, which causes a JavaScript function to be invoked (process block 1004). The JavaScript function sends a request to the server, such as server 804 in FIG. 8, requesting tag suggestions for the current page (process block 1006). Next the results of the request are received from the server (process block 1008). The candidate tags are displayed in a dialog in the client browser for selection by the user (process block 1010). A dialog is an HTML <SELECT> control with <OPTION> elements for each suggested tag. The user selects tags, which places the candidate tag in the tag area of the Wiki tags area (process block 1012). Clicking the "apply" button sends a request to the server to update the tags database table for the current page (process block 1014). Then the operation ends Thus, illustrative embodiments of the present invention provide a programmatic term extraction and categorization technique. The technique both gives a user a sense of what a Wiki page or set of Wiki pages is about and suggests likely and appropriate tag candidates. The Wiki application is scanned, and the relevant terms discussed in each page of the Wiki application are identified. The identified terms are used as tags for a given page or set of pages. The tags can be used to search the Wiki in a more meaningful way, locating and better understanding and managing the information within the Wiki application. Programmatic term extraction can be used to analyze the contents of any type of Web page or any document that is loaded on a data processing system, as well as for Wiki applications.

It should be noted that although the illustrative embodiments of the present invention detailed above were described in terms of a Wiki application in a Wiki environment, the above described illustrative embodiments of the present invention are not limited to a Wiki application in a Wiki environment. The use of a Wiki application in a Wiki environment as an example in the descriptions was not intended to in anyway limit the scope of the present invention. It would be obvious to one of ordinary skill in the art that the above described illustrative embodiments of the present invention apply equally well to any shared environment that may be accessed through an interface by a group of users. Furthermore, while certain aspects of the illustrative embodiments of the present invention described above were explained in terms of JavaScript language, the use of the JavaScript language as an example in the descriptions was not intended to in anyway limit the scope of the present invention. Those of ordinary skill in the art will realize that the illustrative embodiments of the present invention described above may be implemented using any object oriented scripting language.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for processing terms from a current page, the computer implemented method comprising:
   receiving a first request from a client browser to extract the terms from a body field of the current page, wherein a text input area is presented on the current page in the client browser and the text input area is used to generate the first request to extract the terms from the current page by receiving a user input in the text input area;
   responsive to receiving the first request to extract the terms from the body field of the current page, executing a command to extract the terms from the body field of the current page;
   sending a response to the client browser, wherein the response includes a result of the command to extract the terms from the body field of the current page, wherein the result comprises the terms extracted from the body field of the current page and the terms are presented in the text input area of the current page in the client browser; and
   responsive to receiving a second request to store a subset of the terms extracted from the body field of the current page, storing the subset of the terms as tags associated with the current page.

2. The computer implemented method of claim 1, wherein the command to extract the terms from the body field of the current page further comprises:
   retrieving the current page;
   retrieving content from the body field for the current page; and
   sending the first request to a term extraction Web service, wherein the first request comprises the content of the current page and wherein the first request invokes the term extraction Web service.

3. The computer implemented method of claim 2, wherein the term extraction Web service performs the steps of:
   extracting terms from the content of the current page.

4. The computer implemented method of claim 3, wherein the terms extracted from the content of the current page define at least one page category to which the current page belongs.

5. The computer implemented method of claim 1, wherein the current page is a page being displayed by the client browser.

6. The computer implemented method of claim 1, wherein the current page is a page in a collaborative web environment that allows single or multiple users to efficiently integrate static and interactive content.

7. The computer implemented method of claim 1, wherein the command is a command used to implement a function or process of a collaborative web environment that allows single or multiple users to efficiently integrate static and interactive content.

8. The computer implemented method of claim 1, wherein the terms are in an editable format in the text input area after the result is received by the client browser.

9. The computer implemented method of claim 3, wherein the first request further comprises a query that refines the terms extracted from the content.

10. A computer program product comprising a computer readable storage medium including computer usable program code for processing terms from a current page, the computer program product comprising:
    computer usable program code for receiving a first request from a client browser to extract the terms from a body field of the current page, wherein the text input area is presented on the current page in the client browser and the text input area is used to generate the first request to extract the terms from the current page by receiving a user input in the text input area;
    computer usable program code, responsive to receiving the first request to extract the terms from the body field of the current page, for executing a command to extract the terms from the body field of the current page;
    computer usable program code for sending a response to the client browser, wherein the response includes a result of the command to extract the terms from the body field of the current page, wherein the result comprises the terms extracted from the body field of the current page and the terms are displayed in the text input area of the client browser; and
    responsive to receiving a second request to store a subset of terms extracted from the body field of the current page, storing the subset of the terms as tags associated with the current page.

11. The computer program product of claim 10, wherein the computer usable program code for the command to extract the terms from the body field of the current page, further comprises:
    computer usable program code for retrieving the current page;
    computer usable program code for retrieving content from the body field for the current page; and
    computer usable program code for sending the first request to a term extraction Web service, wherein the first request comprises the content of the current page and wherein the first request invokes the term extraction Web service.

12. The computer program product of claim 11, wherein the term extraction Web service comprises:
   computer usable program code for extracting terms from the content of the current page; and
   computer usable program code for categorizing the terms extracted from the content of the current page.

13. The computer program product of claim 10, wherein the current page is a page being displayed by the client browser.

14. The computer program product of claim 10, wherein the current page is a page in a collaborative web environment that allows single or multiple users to efficiently integrate static and interactive content.

15. The computer program product of claim 10, wherein the computer usable program code for the command is computer usable program code for a command used to implement a function or process of a collaborative web environment that allows single or multiple users to efficiently integrate static and interactive content.

16. A data processing system for processing terms from a current page, the data processing system comprising:
   a storage device, wherein the storage device stores computer usable program code; and
   a processor, wherein the processor executes the computer usable program code to receive a first request from a client browser to extract the terms from a body field of the current page, wherein a text input area is presented on the current page in the client browser and the text input area is used to generate the first request to extract the terms from the body field of the current page by receiving a user input in the text input area; responsive to receiving the first request to extract the terms from the body field of the current page, execute a command to extract the terms from the body field of the current page; send a response to the client browser, wherein the response includes a result of the command to extract the terms from the body field of the current page, wherein the result comprises the terms extracted from the body field of the current page and the terms are presented in the text input area of the client browser; and storing a subset of the terms as tags associated with the current page responsive to receiving a second request to store the subset of the terms extracted from the body field of the current page.

* * * * *